_United States Patent Office_

3,356,708
Patented Dec. 5, 1967

3,356,708
PROCESS FOR THE REDUCTIVE DIMERIZATION OF ACRYLONITRILE
Duncan Sheppey Davies and David Colin Jones, Runcorn, England, assignors to Imperial Chemical Industries Limited, London, England, a corporation of Great Britain
No Drawing. Filed May 10, 1965, Ser. No. 454,723
Claims priority, application Great Britain, June 2, 1964, 22,779/64
6 Claims. (Cl. 260—465.8)

ABSTRACT OF THE DISCLOSURE

Process for the reductive dimerization of acrylonitrile wherein an aqueous liquid medium containing acrylonitrile is brought into intimate contact with an alkali metal amalgam, characterized in that the liquid medium contains acetonitrile.

---

This invention relates to the reductive dimerisation of acrylonitrile.

More particularly, the present invention provides a process for reductive dimerization of acrylonitrile wherein an aqueous liquid medium containing acrylonitrile is brought into intimate contact with an alkali metal amalgam, characterized in that the liquid medium contains acetonitrile. The proportion of acetonitrile to the acrylonitrile in the starting reaction mixture is conveniently between 0.01 to 1.0 part by weight of acetonitrile for each part by weight of acrylonitrile but higher proportions of 30:1 or more may be beneficial. Preferably the proportion is in the range 0.02 to 0.2 parts by weight for each part of acrylonitrile by weight.

The reaction medium may contain a mineral acid initially or the acid may be added during the reaction to control the pH which tends to rise during the reaction as the amalgam is reacted. Examples of mineral acids are hydrochloric, sulphuric or phosphoric with hydrochloric preferred. Especially suitable initial concentrations of hydrochloric acid are from 0.1 to 25% weight per volume (calculated in metric units) as anhydrous hydrochloric acid in the aqueous acid.

The following examples illustrate the invention:

Example 1

A cylindrical glass reaction vessel 4 inches in diameter and 6 inches deep was closed at its lower end by a cloth membrane sealed around the lower periphery of the vessel. The inner surface of the membrane was completely covered by a layer of mercury approximately ½ inch deep.

The top of the reaction vessel was provided with a removable cover with an inlet for a platinum wire dipping into the layer of mercury to form a cathode. Within the reaction vessel the platinum wire was sheathed with glass. The reaction vessel was provided with an internal cooling coil and a stirrer was located above the mercury layer.

The reaction vessel was immersed to a depth of about 1 inch in an aqueous solution of potassium hydroxide (40% by weight) contained in an outer cylindrical glass vessel, the outer vessel being filled to a depth of about 4 inches with the said potassium hydroxide solution.

A cylindrical anode, 6 inches in diameter, made from a strip of nickel 1 inch deep, was inserted in the outer vessel symmetrically below the bottom end of the reaction vessel and spaced from it by about 1 inch.

A reaction mixture consisting of 31.7 grams of acrylonitrile, 3 grams of acetonitrile and 400 ml. of aqueous hydrochloric acid (containing 20 grams hydrochloric acid per 100 ml. of aqueous solution) was placed in the reaction vessel. Stirring was begun and the temperature of the reaction mixture was maintained below 25° C. while a current of 50 amps was passed between the anode and the cathode.

After the current had been passed for 10 minutes the mixture was removed from the reaction vessel and the vessel was washed out with water. The reaction mixture and washings were combined and steam distilled. The distillate was saturated with potassium carbonate and the organic layer, comprising acrylonitrile, acetonitrile and propionitrile, was separated; the weight of the organic layer was 26.7 grams and the acrylonitrile content was found to be 23.2 grams.

The aqueous residue from the steam distillation was extracted with chloroform (six portions of 30 ml.). The chloroform extracts were combined and the chloroform was removed by distillation, leaving as residue 2.4 grams of adiponitrile.

By way of comparison a reaction was carried out in the same way except that the acetonitrile was omitted from the reaction mixture. The amount of adiponitrile obtained as residue was 2.2 grams.

Example 2

A reaction was carried out as described in Example 1 except that the current was passed for 20 minutes. The amount of adiponitrile obtained was 8.5 grams.

By way of comparison a reaction was carried out in the same way except that the acetonitrile was omitted from the reaction mixture. The amount of adiponitrile obtained was 4.4 grams.

Example 3

A reaction was carried out as described in Example 1 except that the current was passed for 25 minutes. The amount of adiponitrile obtained was 8.3 grams.

By way of comparison a reaction was carried out in the same way except that the acetonitrile was omitted from the reaction mixture. The amount of adiponitrile obtained was 7.1 grams.

Example 4

A reaction mixture consisting of 16 grams of acrylonitrile, 214 grams of acetonitrile, and 320 grams of water was placed in a reaction vessel. Stirring was begun and the temperature of the reaction mixture was obtained at 25° C. 2500 grams of 0.2% sodium mercury amalgam was added over a period of 2 hours. The pH of the solution was maintained between 7–10 by continuous addition of 8% weight/weight hydrochloric acid. 1.5 grams of adiponitrile was formed representing a 22 percentage weight yield on acrylonitrile and a resulting percentage yield on sodium of 12.8.

For comparison a run was performed without acetonitrile using 16 grams of acrylonitrile and 550 grams of water, other conditions being identical. This resulted in the formation of 0.22 gram of adiponitrile giving a percentage weight yield on acrylonitrile of 4.4 and a percentage yield on sodium of 1.9.

Example 5

Example 4 was repeated using 8 grams of acrylonitrile, 214 grams of acetonitrile and 320 grams of water. 0.23 gram of adiponitrile were formed giving a percentage weight yield on acrylonitrile of 4.4 and a resulting percentage yield on sodium of 2.0.

For comparison a similar run was performed without acetonitrile using 8 grams of acrylonitrile and 550 grams of water, other conditions being identical. This resulted in the formation of 0.11 gram of adiponitrile giving a percentage weight yield on acrylonitrile of 2.4 and a percentage yield on sodium of 1.02.

What we claim is:

1. In a process for the reductive dimerization of acrylonitrile wherein an aqueous liquid medium containing acrylonitrile is brought into intimate contact with an alkali metal amalgam, the improvement which comprises utilizing as the aqueous liquid medium, one that contains added acetonitrile.

2. A process as claimed in claim 1 in which 0.01 to 1.0 part by weight of acetonitrile are present in the starting reaction mixture for each part by weight of acrylonitrile.

3. A process as claimed in claim 2 in which 0.02 to 0.2 part by weight of acetonitrile are present in the starting reaction mixture for each part of acrylonitrile.

4. A process as claimed in claim 1 wherein the aqueous liquid medium is maintained at a pH within the range of from 7–10 by incorporating an acid in the medium during the course of the reductive dimerization.

5. A process as claimed in claim 4 in which the aqueous medium is a mineral acid.

6. A process as claimed in claim 5 in which the mineral acid added continuously to the medium is hydrochloric acid.

References Cited

UNITED STATES PATENTS

| | | | |
|---|---|---|---|
| 2,439,308 | 4/1948 | Leekley | 260—465.8 |
| 3,140,276 | 7/1964 | Forster | 204—72 X |
| 3,193,480 | 7/1965 | Baizer et al. | 204—72 X |
| 3,249,521 | 5/1966 | Baizer | 204—72 X |
| 3,250,690 | 5/1966 | Baizer | 204—72 X |

OTHER REFERENCES

Knunyants et al., Akademiia Nauk S.S.S.R. (1957) pp. 238–240.

JOSEPH P. BRUST, *Primary Examiner.*